May 18, 1965  T. A. REILLY  3,184,341

LEAK-RESISTANT DRY CELL

Filed July 12, 1962

INVENTOR.
THOMAS A. REILLY
BY
ATTORNEY

3,184,341
LEAK-RESISTANT DRY CELL
Thomas A. Reilly, Cleveland, Ohio, assignor to Union Carbide Corporation, a corporation of New York
Filed July 12, 1962, Ser. No. 209,344
12 Claims. (Cl. 136—133)

This invention relates to leak-resistant dry cells of the type having a closed container surrounding the cell proper.

The so-called Le Clanche dry cell used for flashlights, portable radios, photoflash and other devices has gone through an evolution of improvements during the past decade or more in an attempt by manufacturers to prevent leakage from the cell during and after its use. Despite the many proposals, however, that have been advanced, there still remains a need for a better leak-resistant dry cell.

One proposal that has been adopted commercially is to encase a conventional dry cell within a closed container. This dry cell construction, however, has been plagued by certain difficulties. For example, one type of container which has been used comprises a metal container, but this suffers from the disadvantage that the metal is subject to corrosion by liquid exudate from the cell. To avoid this disadvantage, non-corrodible containers have also been utilized. The principal difficulty, however, with non-corrodible containers is that they do not possess the mechanical strength of metal containers and suffer from the disadvantage that they may often be damaged, and even destroyed, by the pressure which builds up from the formation of gas within the cell. Several suggestions have been advanced for overcoming this disadvantage of non-corrodible containers in which the attempt has been made to continuously vent the gas from the cell. Thus, in prior constructions, the gas has been vented, for example, through the carbon electrode, and then out through venting means provided in the top closure of the container. The difficulty, however, with these suggestions is that the venting paths, for instance through the carbon electrode, have been prone to obstruction by cell exudate, thereby blocking the passage of gas from the cell.

It is therefore an important object of the invention to provide an improved gas venting path in a leak-resistant dry cell particularly of the type of construction utilizing a non-corrodible container, which gas venting path is not prone to obstruction during use of the cell.

The above and other objects are achieved by the invention which includes the provision of a seal for the carbon electrode in a leak-resistant dry cell, which seal is so arranged as to protect the carbon electrode against the penetration of liquid, while at the same time permitting the continuous venting of gas through the electrode and out of the cell.

Figure 1:
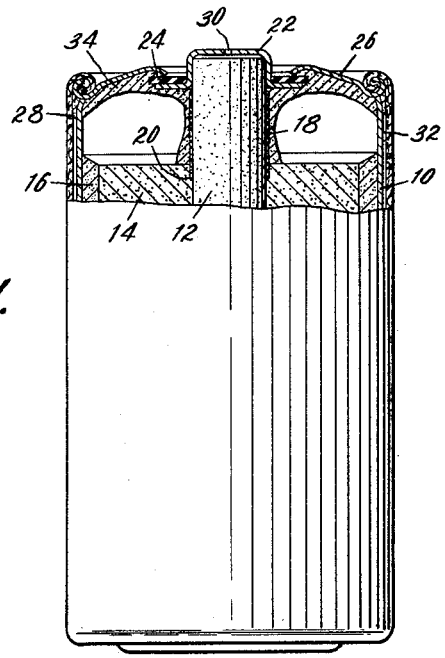
FIG. 1 is a vertical elevation partially in section of a leak-resistant dry cell embodying the invention.

Referring now to the drawing, a leak-resistant dry cell embodying the invention comprises a cupped electrode 10 of a consumable metal, for example, zinc, having therein a porous carbon electrode 12 embedded within a depolarizer mix 14 and an immobilized electrolyte 16, suitably of a conventional "paste," which surrounds the depolarizer mix 14 and separates it from the cupped electrode 10. At its upper end the carbon electrode 12 extends into contact with a top closure, this arrangement providing a free space between the top closure and the depolarizer mix 14 which serves as a cell exudate chamber. The upper portion of the carbon electrode 12 has provided on its surfaces a seal consisting of a relatively thin sealing layer 18 which surrounds the electrode 12 and which is adhered thereto, this sealing layer 18 on the electrode 12 extending a short distance (approx. ¼ inch in a D size cell) below the top surface of the depolarizer mix 14 as indicated at 20. In the constructions illustrated in FIGS. 1 and 2, the sealing layer 18 is provided on the electrode 12 within the free space just below the top closure, leaving the top of the electrode 12 exposed where it makes contact with the top closure. The sealing layer 18 is composed of a liquid and gas impermeable material, for example, microcrystalline wax, asphalt or lacquer, and may be applied to the electrode 12 prior to manufacture of the cell in a number of different ways as shall be described in detail hereinafter.

The top closure for the cell comprises a flanged metal cap 22 fitted on the top of the carbon electrode 12 and an insulating washer 24 which is supported on the metal cap 22. The inner edges of a metal washer 26 engage the insulating washer 24 and its outer peripheral edges are locked in engagement with a jacket 28. As also shown in the constructions illustrated in FIGS. 1 and 2, the outer edges of the metal washer 26 rest on the upper edges of the cupped electrode 10, and the metal cap 22 is provided with an opening 30 for venting gas from the cell.

The jacket 28 is non-corrodible, it being composed, for example, of paper and fits the cupped electrode 10 rather loosely, thereby providing a supplementary chamber 32 for receiving cell exudate when the cupped electrode 10 becomes perforated. Although not shown, the jacket 28 also secures a typical "false" bottom closure in contact with the bottom of the cupped electrode 10.

Figure 2:
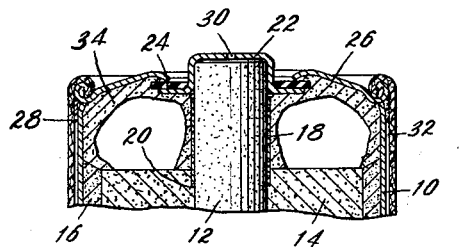
FIG. 2 is a sectional view of the top portion only of a dry cell showing another embodiment of the invention.

In the dry cell of the invention, it is desirable in most instances that the cell be provided with an inner seal in the free space below the top closure. For instance, in the construction illustrated in FIG. 1, an inner seal 34 is provided which underlies the top closure and which surrounds the carbon electrode 12 down to the top surface of the depolarizer mix 14. It should be noted that this inner seal 34 overlies the sealing layer 18 on the electrode 12 providing additional protection to the electrode 12, and preferably adheres to the depolarizer mix 14, while at the same time, it protects the metal washer 26 and the metal cap 22 of the top closure against corrosion. As also shown in FIG. 1, the inner seal 34 extends over both the inside and outside upper edges of the cupper electrode 10, and aids in preventing leakage through the locked engagement between the metal washer 26 and the jacket 28. In the construction of FIG. 2, the inner seal 34 completely overlies the upper edges of the inside of cupped electrode 10. This construction is the most desirable because so-called "air-line" corrosion and early perforation of the cupped electrode 10 is prevented. The inner seal 34 in both constructions (FIGS. 1 and 2) may also be composed of a liquid and gas impermeable material, for example, microcrystalline wax, if desired.

During use of the cell, especially under severe conditions, gas is released. A portion of this gas, which originates within the depolarizer mix 14, passes directly into the porous carbon electrode 12, while other portions of the gas pass into the free space between the top closure and the depolarizer mix 14. At the same time, liquid is exuded through the depolarizer mix 14 towards the cupped electrode 10 and eventually collects within the free space (exudate chamber), where it is confined. The gas, which passes into the free space, eventually passes down through the depolarizer mix 14, its top surface being freely exposed, and passes into the carbon electrode 12, the gas then being vented through the opening 30 in the metal cap 22 and out of the cell. When large quantities of gas are generated, for example, when the cell is subjected to very heavy discharge, the pressure within the free space often can build up to a point where the gas actually forces liquid exudate ahead of it, particularly through the interface between the inner seal 34 and the top surface of the depolarizer mix 14. Should this happen, both the liquid exudate and gas, which collect in the free space, are barred from entering the carbon electrode 12 by the sealing layer 18, thereby preventing obstruction of the gas passage through the electrode 12. Furthermore, while some liquid exudate under the influence of this gas pressure may penetrate through the top surface of the depolarizer mix 14, this penetration being only slight since the depolarizer mix 14 acts as a filter, the portion of the sealing layer 18 which extends below the depolarizer mix 14 effectively blocks off the exudate from entering the carbon electrode 12.

Figure 3:
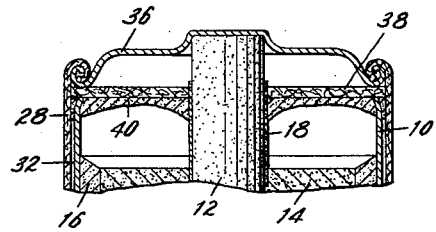
FIG. 3 is a sectional view showing still another embodiment.

It will be appreciated that the principles of the invention are applicable to a variety of dry cell constructions. For example, as shown in FIG. 3, the dry cell may be provided with a one-piece top closure composed of a metal plate 36 which rests on the top of the porous carbon electrode 12 and which at its outer edges is locked into liquid-tight engagement with the jacket 28. Below the top closure there is provided a washer 38, suitably of paper or cardboard, which is placed around the carbon electrode 12 and which rests on the upper edges of the cupped electrode 10. The washer 38 is secured between the cupped electrode 10 and the outer edges of the metal plate 36 and has its outer peripheral edges held securely in juxtaposition with the jacket 28. This construction, it will be noted, provides an upper free space between the top closure and the washer 38, and a lower free space above the depolarizer mix 14 which serves as the cell exudate chamber. The carbon electrode 12 is protected by a similar sealing layer 18 which is provided in this construction only on the electrode surfaces within the lower free space below the washer 38. A subseal 40 composed, for example, of microcrystalline wax underlies the washer 38 in the lower free space and also partially covers the upper portion of the sealing layer 18 on the electrode 12. In this construction it will be noted that gas venting takes place from within the depolarizer mix 14 or from the lower free space, where it may collect, down through the depolarizer mix 14 and into and through the porous carbon electrode 12. The gas is then vented into the upper free space below the top closure where the gas escapes out of the cell through the locked engagement between the metal plate 36 and the jacket 28, this locked engagement being liquid-tight but not gas-tight.

A dry cell embodying the invention may be constructed in many different ways. For instance, the sealing layer 18 of the invention may be applied to the carbon electrode 12 by brushing or painting the wax, asphalt or lacquer onto its surfaces, or in the alternative, the electrode 12 may be dip-coated. When lacquer is used, the sealing layer 18 may be applied by spraying. The electrode surfaces which are not to be coated should be masked, for example, the top of the electrode 12 which makes contact with the top closure. Regardless of the method employed, it is important that the sealing layer 18 be sufficiently thick to bar the passage of gas as well as liquid through the shielded portions of the electrode 12. In this regard, it should be noted that, while in prior constructions, wax impregnated electrodes have been used, these electrodes are generally not impervious to gas since at most only a relatively thin layer of wax is present on the electrode surfaces. The inner seal 34 in the construction of FIG. 1, for example, may also be achieved in a number of ways. A convenient way is to coat the inner side of the top closure prior to assembly with a layer of wax sufficient to form the seal. The top closure, after the cell is assembled, is then heated slightly to cause some of the wax to flow down and around the carbon electrode 12, hence sealing the electrode 12 within the free space below the top closure. In the alternative, a wax washer may be positioned just underneath the top closure during assembly which is melted again by heating the top closure. The assembled cell may be rolled about its upper peripheral edges, when the seal is formed, in order to assure that the underneath side of the top closure is completely coated with the wax.

It will be understood that many changes and modifications of the several dry cell constructions described herein may be made without departing from the spirit and scope of the invention.

This application is a continuation-in-part of my copending application Serial No. 106,769, filed on May 1, 1961.

I claim:

1. A leak-resistant dry cell comprising, in combination, a cupped electrode of consumable metal containing depolarizer mix and electrolyte; a closure for said cell having gas venting means therein, said closure being spaced from said depolarizer mix, providing a free space thereabove, the surface of said depolarizer mix being exposed to said free space; a porous carbon electrode embedded within said depolarizer mix and extending into contact with said closure; and a liquid and gas impermeable seal adhered to and surrounding the surfaces of said porous carbon electrode normally exposed within said free space and a short distance below said surface of said depolarizer mix, protecting said porous carbon electrode against penetration of liquid and gas within said free space; said porous carbon electrode in conjunction with said gas venting means in said closure providing a path for venting gas from said cell.

2. A leak-resistant dry cell comprising, in combination, a cupped electrode of a consumable metal containing depolarizer mix and electrolyte; a top closure for said cell having gas venting means therein, said top closure being spaced from said depolarizer mix, defining a free space therebetween, the surface of said depolarizer mix being exposed to said free space; a porous carbon electrode embedded within said depolarizer mix and extending into contact with said top closure; a liquid and gas impermeable sealing layer on adhered to and surrounding the surfaces of said porous carbon electrode normally exposed within said free space and a short distance below said surface of said depolarizer mix; and an inner seal below said top closure and overlying said liquid and gas impermeable sealing layer on said porous carbon electrode within said free space; said porous carbon electrode in conjunction with said gas venting means in said top closure providing a path for venting gas from said cell.

3. A leak-resistant dry cell as defined by claim 2 wherein said inner seal underlies said top closure and also overlies the upper inner edges of said cupped electrode between said depolarizer mix and said top closure.

4. A leak-resistant dry cell as defined by claim 2 wherein said inner seal is composed of a liquid and gas impermeable material.

5. A leak-resistant dry cell comprising, in combination, a cupped electrode of a consumable metal containing depolarizer mix and electrolyte; a top closure for said cell having gas venting means therein; a porous carbon electrode embedded within said depolarizer mix and extending into contact with said top closure; a washer fitted around said porous carbon electrode, defining an upper free space below said top closure and a lower free space above said depolarizer mix, the surface of said depolarizer mix being exposed to said lower free space; and a liquid and gas impermeable sealing layer on adhered to and surrounding the surfaces of said porous carbon electrode normally exposed within said lower free space and a short distance below said surface of said depolarizer mix; said porous carbon electrode in conjunction with said upper free space and said gas venting means in said top closure providing a path for venting gas from said cell.

6. A leak-resistant dry cell as defined by claim 5 wherein a subseal is provided within said lower free space, underlying said washer and overlying said liquid and gas impermeable sealing layer on said porous carbon electrode.

7. A leak-resistant dry cell as defined by claim 6 wherein said subseal is composed of a liquid and gas impermeable material.

8. In a leak-resistant dry cell having a cupped electrode of a consumable metal containing depolarizer mix and electrolyte, a closure for said cell locked into engagement with a jacket surrounding said cupped electrode, said closure having gas venting means therein, and a porous carbon electrode embedded within said depolarizer mix and extending into contact with said closure; the improvement whereby said porous carbon electrode is protected against penetration of liquid, which improvement comprises a liquid and gas impermeable sealing layer on adhered to and surrounding the surfaces of said porous carbon electrode between said closure and said depolarizer mix and a short distance below said depolarizer mix, said porous carbon electrode in conjunction with said gas venting means in said closure providing a path for venting gas from said cell.

9. A leak-resistant dry cell as defined by claim 8 wherein an inner seal is provided underlying said closure and overlying said liquid and gas impermeable sealing layer on said porous carbon electrode and wherein said inner seal is adhered to the surface of said depolarizer mix.

10. A leak-resistant dry cell as defined by claim 8 wherein said jacket is non-corrodible.

11. A leak-resistant dry cell as defined by claim 8 wherein the locked engagement between said closure and jacket is liquid-tight but not gas-tight.

12. A leak-resistant dry cell as defined by claim 8 wherein said closure is composed of metal in one piece.

References Cited by the Examiner
UNITED STATES PATENTS

| | | | |
|---|---|---|---|
| 2,850,558 | 9/58 | Uny | 136—133 |
| 3,051,769 | 8/62 | Jammet | 136—133 |
| 3,090,824 | 5/63 | Reilly et al. | 136—107 |

FOREIGN PATENTS

| | | |
|---|---|---|
| 792,152 | 3/58 | Great Britain. |
| 869,875 | 6/61 | Great Britain. |

JOHN H. MACK, *Primary Examiner.*